United States Patent

[11] 3,603,608

| [72] | Inventor | George A. Kirkpatrick |
| | | P.O. Box 693, Ridgecrest, Calif. 93555 |
| [21] | Appl. No. | 849,938 |
| [22] | Filed | Aug. 12, 1969 |
| [45] | Patented | Sept. 7, 1971 |

[54] DOLLY FOR HANDLING LONG HEAVY OBJECTS
1 Claim, 10 Drawing Figs.

[52] U.S. Cl. .................................................. 280/47.13R
[51] Int. Cl. ...................................................... B60p 3/40, B62b 1/00
[50] Field of Search .......................................... 280/47.13, 47.24, 47.3; 296/20

[56] References Cited
UNITED STATES PATENTS

| 345,467 | 7/1886 | Williams | 280/47.24 X |
| 2,188,578 | 1/1940 | Robinson | 280/47.24 |
| 2,377,399 | 6/1945 | Brumfield | 280/47.24 X |
| 2,918,296 | 12/1959 | Goodale | 280/47.3 X |
| 3,222,100 | 12/1965 | Lindzy | 296/20 |
| 3,236,537 | 2/1966 | Eckman | 280/47.3 X |

FOREIGN PATENTS

| 1,098,099 | 3/1955 | France | 280/47.24 |
| 1,031 | 1/1900 | Great Britain | 280/47.24 |

Primary Examiner—Benjamin Hersh
Assistant Examiner—Leslie J. Paperner
Attorneys—Herbert E. Kidder and Peter H. Firsht ABSTRACT: A lightweight dolly is provided for handling a long, heavy object, such as a roll of carpet, padding, linoleum and the like, by one person. The dolly has a generally rectangular frame of round tubular material for cradling the object and consisting of straight sides, downwardly bent ends and rounded corners. Dependingly joined to the frame within the side edges thereof is a support structure including a pair of V-shaped members, a transverse sleeve and braces between the sleeve and side members, all of round tubular material. An axle is received in the sleeve and mounts a pair of wheels inwardly of the frame side edges. The dolly is thus devoid of lateral and upward projections. The wheels are provided with pneumatic tires of a size facilitating movement of the dolly up and down steps, over curbs, etc.

INVENTOR.
GEORGE A. KIRKPATRICK

PATENTED SEP 7 1971 3,603,608

INVENTOR.
GEORGE A. KIRKPATRICK
By Herbert E. Kidder
AGENT

INVENTOR
GEORGE A. KIRKPATRICK
BY
HERBERT E. KIDDER
AGENT

DOLLY FOR HANDLING LONG HEAVY OBJECTS

BACKGROUND OF THE INVENTION

The present invention relates to a dolly, or cart, and more particularly to a lightweight dolly for the handling of a large heavy object, such as a roll of carpet, padding, or linoleum and the like, by one person.

In enterprises involving the installation of floor coverings, it is necessary to handle objects such as rolls of carpet, padding, linoleum, and the like, which are relatively long, bulky and heavy. The carpet comes in various widths; 54 inches, 9 feet, 12 feet and 15 feet. The weight of carpet varies from 350—500 pounds for an average roll of 54- inch material (over 100 feet long) to considerably more for the greater widths. Sponge rubber padding is also heavy and presents an additional problem because it is limber. Such objects are often more than one person is able to handle unaided, and require the assistance of a helper, thus adding to the cost of handling and/or installation of the carpet. Such added cost can well spell the difference between the financial success or failure of the enterprise.

Dollies presently used are of relatively heavy construction and cannot go over curbs or up stairs. They also have difficulty going through sand or gravel or over irregular terrain.

SUMMARY OF THE INVENTION

One of the primary objects of this invention is to provide a lightweight dolly of novel form especially adapted for the handling of long, heavy objects by one person.

Another object of the invention is to provide a lightweight dolly of simple construction which is economical to produce, easy to operate, and which facilitates the handling of long heavy objects.

A further object is to provide a dolly which has a frame for cradling a long heavy object and has nothing projecting laterally of the frame, whereby the dolly can pass through doorways, halls, and the like, which are only slightly wider than the frame.

Still another object of the invention is to provide a lightweight dolly having an open frame with downwardly curved ends and intermediate cross braces for cradling a long heavy object longitudinally thereof, the frame being symmetrically disposed above a pair of supporting wheels and tiltable for sliding the dolly relative to the object for centering or discharge of the object.

A still further object of the invention is to provide a dolly having an open frame which is generally rectangular horizontally, generally triangular vertically, and has a pair of supporting wheels inward of the frame midway of the length thereof, whereby the dolly is devoid of outward projections for facilitating receipt and passage of a long heavy object, and the frame can be tilted for discharge of the object.

These and other objects and advantages of the present invention are achieved by the provision of a dolly having a generally rectangular frame of round tubular material for cradling a long heavy object and consisting of straight sides, downwardly bent ends and rounded corners. Secured to the frame are a pair of V-shaped members and cross braces of round tubular material defining an open, generally triangular structure. A transverse sleeve is supported on the structure and receives an axle on which a pair of wheels are mounted inwardly of the side edges of the frame, whereby nothing projects laterally therebeyond. The cross braces are connected between the sleeve and the midpoints of the sides. The wheels are provided with pneumatic tires of a size facilitating movement of the dolly up and down steps and through sand or gravel and over irregular terrain.

DESCRIPTION OF THE DRAWINGS

DESCRIPTION OF PREFERRED EMBODIMENTS in In FIG. 1 there is shown a dolly 10 in accordance with the present invention, which supports a long bulky object 12 received from a carrier 14, such as a truck or the like. Referring to FIG. 2, the dolly 10 has a generally rectangular frame 16 consisting of sides 18 and ends 20 joined by rounded corners 22. The frame members are of round material, preferably tubular, in the interests of reducing the weight of the frame while providing sufficient strength for its purpose. As better seen in FIGS. 3 and 4, the frame ends 20 are downwardly curbed or bent for receiving the object 12 and cradling it on the frame.

Figure 1:
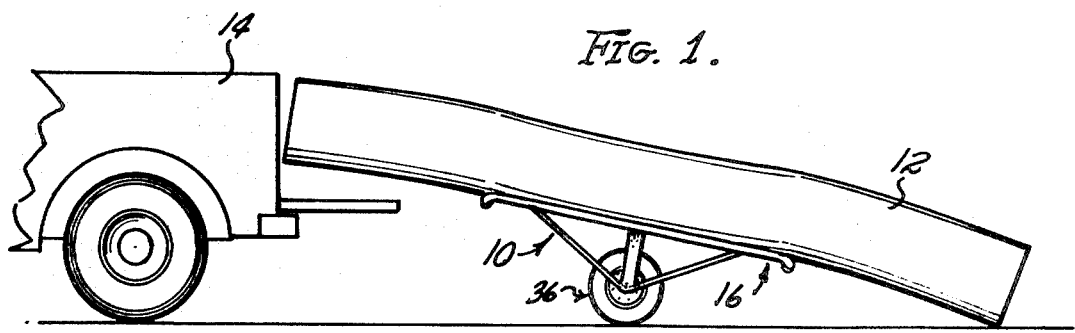
FIG. 1 is a side elevation of a dolly embodying the principles of the present invention, showing a long heavy object cradled thereon as received from a truck or the like illustrated fragmentarily.

Secured to each of the frame sides 18 is a V-shaped member 24 of round tubular material having legs of equal length. Each V-shaped member and associated frame side defines a generally triangular structure 26. Interconnecting the midpoints of the frame side and V-shaped member of each triangular structure, as by welding 28 or the like, is a vertically disposed planar plate 30. Each plate has an outer surface disposed generally in the plane of the triangular structure and inwardly of the side edges thereof.

Figure 5:
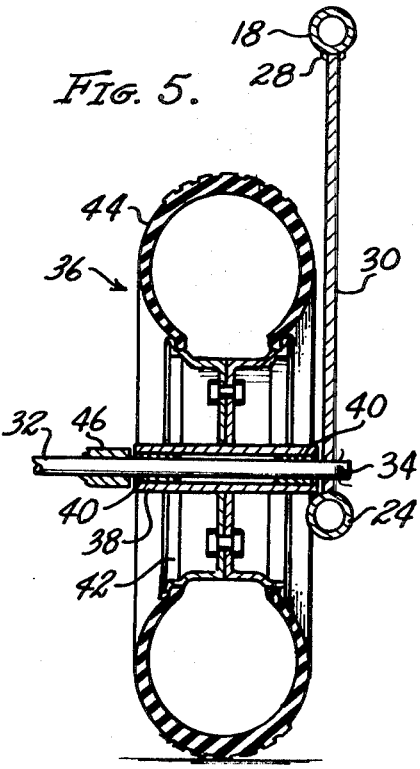
FIG. 5 is an enlarged fragmentary sectional view on line 5—5 of FIG. 3.

Supported on the lower ends of the plates 30 and extending therebetween is a transverse axle 32, the ends of which are adapted to receive retainers 34, such as cotter pins or the like. Mounted for rotation on the axle are wheels 36. As best seen in FIG. 5, each wheel has a hub 38 containing spaced bearings 40, a rim 42 connected to the hub, and a pneumatic tire 44 mounted on the rim. The wheels are disposed adjacent to the respective plates 30 inwardly thereof, and are held in spaced relation by a spacer sleeve 46.

Figure 2:
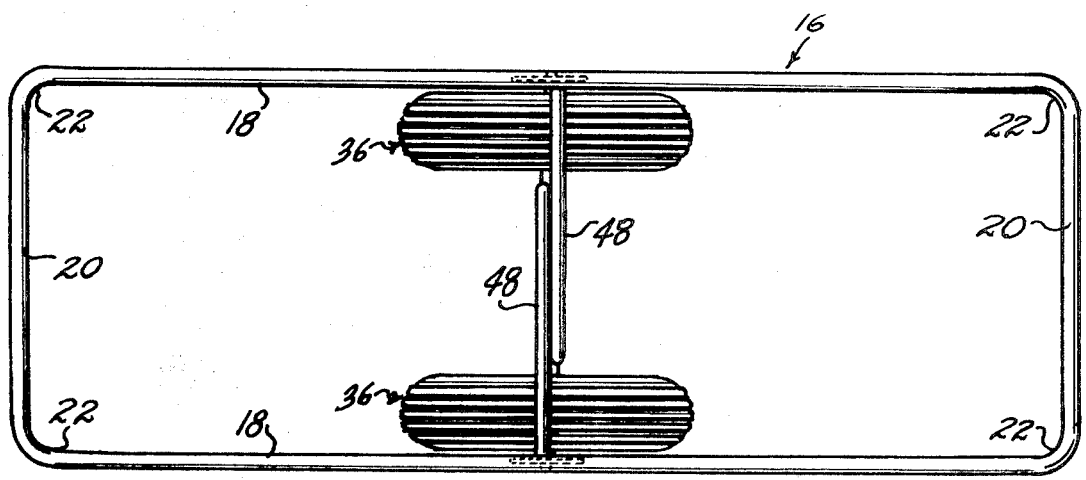
FIG. 2 is an enlarged top plan view of the dolly, illustrating the disposition of the wheels within the dolly frame, and the absence of any lateral projections on the frame.
Figure 4:
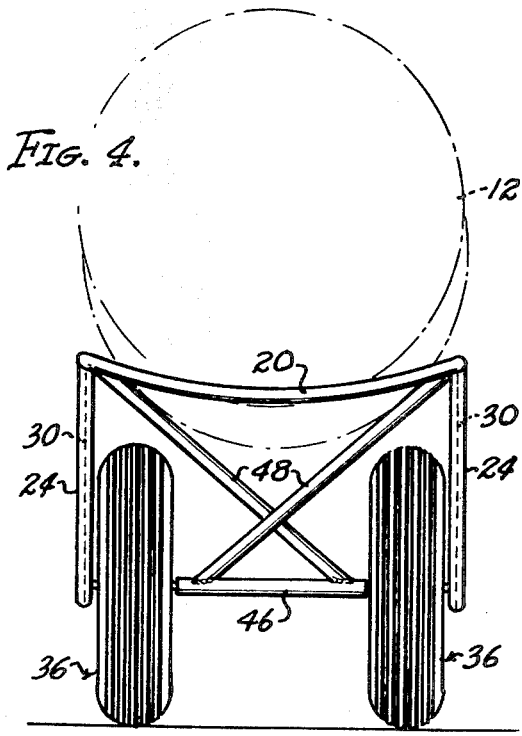
FIG. 4 is a rear end view of the dolly, showing an object thereon in phantom lines.
Figure 6:
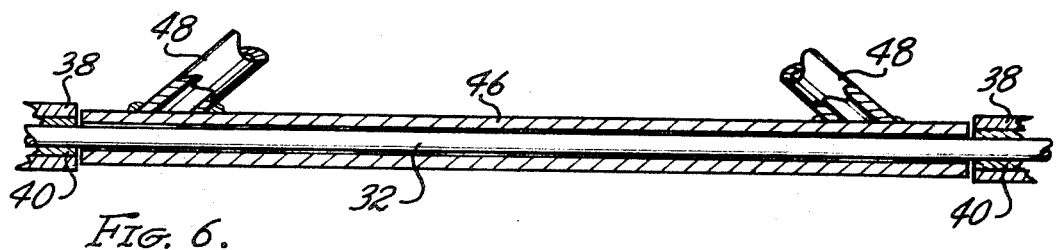
FIG. 6 is a fragmentary sectional view of the spacer sleeve, illustrating its relationship with the wheel axle and the lower ends of the cross braces.
Figure 7:
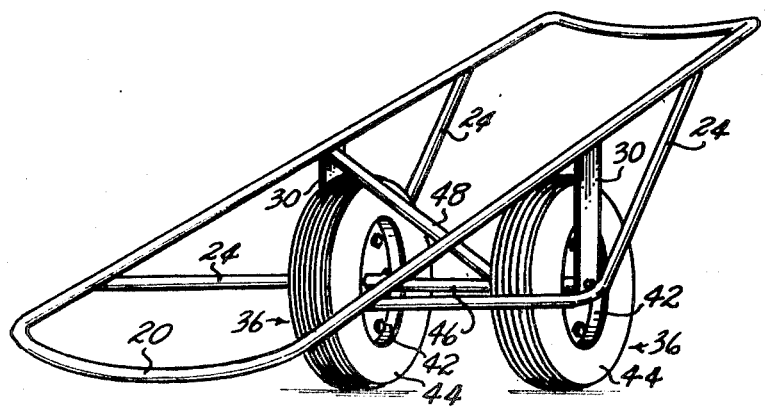
FIG. 7 is a perspective view of the dolly in a tilted position.

The spacer sleeve 46 extends between the hubs 38 and surrounds the axle 32, as shown in FIG. 6. Welded or otherwise secured to spacer sleeve 46 are the lower ends of a pair of inclined struts or cross braces 48 of round tubular material. The cross braces are in close proximity to each other and are disposed midway of the length of the frame 16, as shown in FIGS. 2 and 7. The upper ends of the braces 48 are welded or otherwise suitably secured to the respective frame sides 18 at substantially the midpoints thereof. Should the midportion of the object 12 sag, the cross braces serve to engage and support the same, as shown in phantom lines in FIG. 4. The object is thus cradled on the frame 16 longitudinally thereof.

It is to be noted that frame 16 is symmetrically supported on the wheels 36, and when the midportion of object 12 is over the cross braces 48 the load is balanced. It is also to be noted that there are no projections laterally of the frame or the triangular structures 26, so that the dolly and its load can be maneuvered through doorways and halls which are but slightly wider than the frame, easily and without snagging. Additionally, the frame 16 is also devoid of upward projections, which, together with its downwardly curved ends 20, facilitates the receipt of the object 12 thereon. For example, in loading the object onto the dolly from a truck or the like, pull is exerted on the rear end of the object until a sufficient length thereof projects behind the truck. The tailgate of the truck may be as shown in FIG. 1 or down, completely or partly. Then the dolly can be placed adjacent the truck under the projecting end of the object and in longitudinal alignment therewith. The handler can then stand behind the frame 16 for lifting and pulling the end of the object over the downwardly curved end 20 proximal to the handler. This continues until the object is substantially centered on the dolly, after which the dolly can be tilted and/or pulled to remove the object from the truck. The roundness and downward curvature of the frame ends 20 facilitate the pulling of the object and prevent lateral sliding thereof. To center the object for better balance, the dolly can be placed in the tilted position, as shown in FIG. 7, so that one end of the object is placed in engagement with the ground or floor, and the other end of the object lifted by the handler, after which the dolly can be slid or moved relative to the object to place it under the central portion thereof. The handler is therefore at most required to lift only about half of the weight of the object.

The lack of upward projections and the cradling effect of the downwardly curved frame ends 20 can be taken advantage of in loading the dolly from a rack or shelf supporting the object to be loaded. In such a case, the dolly can be placed alongside the rack or shelf, generally parallel thereto, after which the object can be rolled or dropped onto the dolly.

Figure 3:
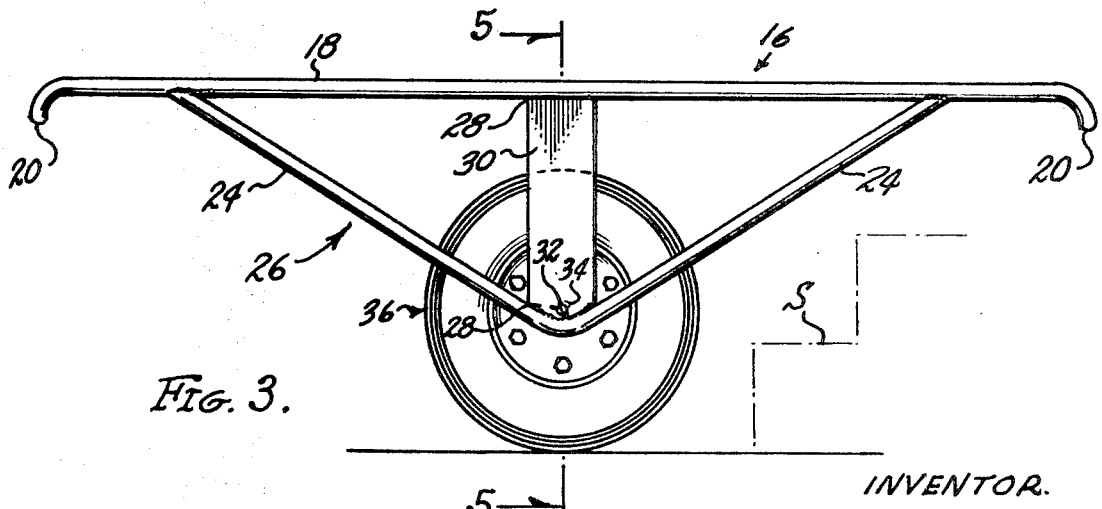
FIG. 3 is a side elevation of the dolly, illustrating its symmetry, the lack of any upward projections on the dolly frame, and the relation of the wheels to a set of steps.

It is also intended that the dolly be capable of negotiating curbs or steps usually encountered in transporting an object to the point of installation. To this end, the supporting wheels are chosen to be equipped with pneumatic tires 44 having a size suitable to roll up steps S, shown in phantom lines in FIG. 3, under sufficient impetus imparted to the dolly and its load by the handler. Wheels with tires having an overall diameter of about 16 inches have proved sufficient for the purpose and also facilitate movement of the dolly over sand, gravel and irregular terrain.

In a general purpose dolly satisfactory in most situations, the frame 16 has a width of about 22 inches, and a length of about 5 feet, the ends 20 having a downward curvature providing a two-inch drop. The axle 32 is centered about 15 inches below the frame, thereby locating the frame about two feet above the base on which the wheels rest. The ends of the V-shaped members 24 have a spread of about three feet, and are connected to the frame about one foot inwardly of the ends thereof. A dolly so constructed weighs about 45 lbs. The several parameters can, of course, be varied to meet different situations.

The operation of the dolly of the present invention is believed to be self-evident from the foregoing description. The dolly 10 is placed under and longitudinally aligned with a sufficient length of an object 12 pulled from a truck 14 or other carrier. Standing behind the dolly, the handler lifts and pulls the near end of the object, stepping back as necessary while holding the dolly next to the truck, until the object is substantially centered on the frame. This requires that the handler lift no more than half the weight of the object. The dolly is then tilted and/or pulled to remove the object. To center the object on the frame, it is only necessary to tilt the dolly to engage one end of the object with the base, after which the dolly is moved under the central portion of the object and returned to horizontal position. The object can then be wheeled to the place of installation, the narrow width of the frame providing free passage through doors and hallways without snagging. Any steps encountered on the way can be negotiated by propelling wheels 36 thereagainst, the reaction within the tires 44 serving to "bump" the dolly and its load up the steps. In a case where the steps are descended, it is only necessary to hold back on the load and let the wheels drop from step to step. To discharge the object, the dolly is tilted and slid away from the object.

The empty dolly is easily pulled up onto the truck and can be transported thereon upright or inverted over the object or objects. It is to be understood, of course, that the dolly can transport several objects of slender proportions at one time.

Figure 9:
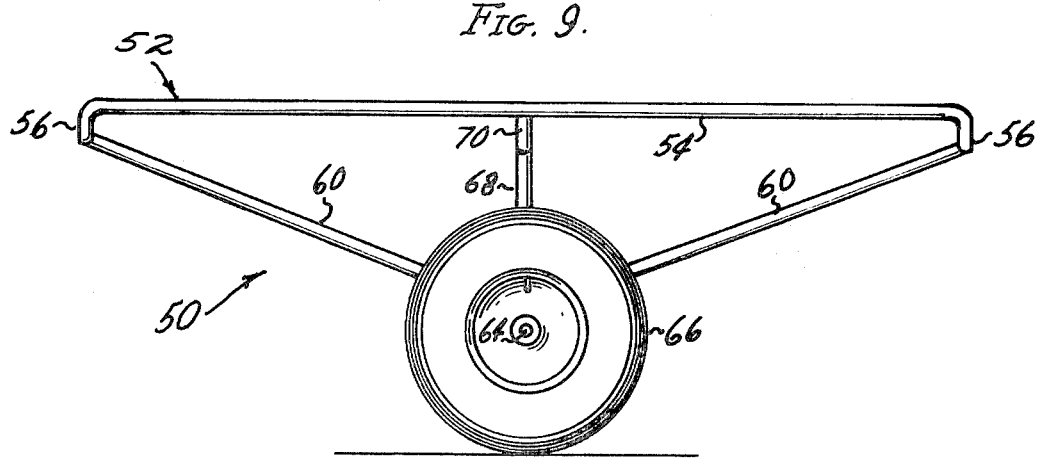
FIG. 9 is a side elevational view of the modified dolly.
Figure 10:
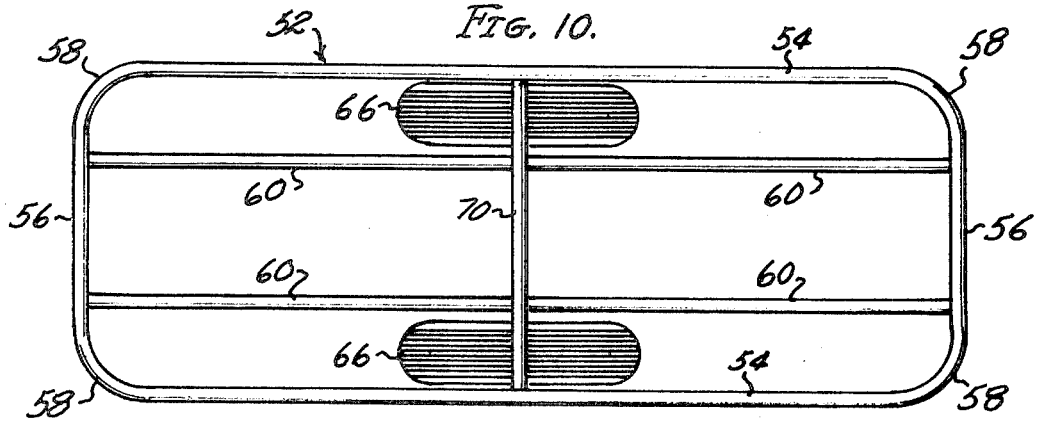
FIG. 10 is a plan view of the modified dolly.
Figure 8:
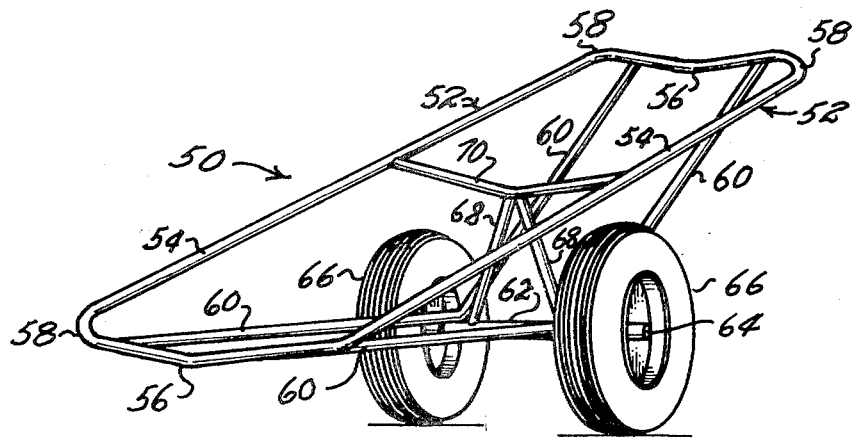
FIG. 8 is a perspective view of a modified form of dolly in accordance with the present invention.

FIGS. 8–10 show a modified form of dolly 50 in accordance with the present invention which includes a generally rectangular frame 52 of round tubular material consisting of sides 54, downwardly bent ends 56 and rounded corners 58. Connected to the ends 56 are symmetrical V-shaped members 60 extending below the frame 52 and therewith defining a generally triangular structure.

As shown in FIG. 8, secured to the V-shaped members 60, at the angle thereof, is a transversely disposed sleeve 62 which receives an axle 64. Journaled on the axle are pneumatically tired wheels 66, which are similar to wheels 36 previously described. Wheels 66 are disposed outwardly of the V-shaped members but inwardly of the side edges of the frame 52, as shown in FIG. 10.

Fixed to the sleeve 62 and extending upwardly therefrom are converging braces or struts 68. The upper ends of the struts are secured to the midportion of a crossbar 70 which extends over the wheels and is secured to the frame sides 54 at the midpoints thereof. The crossbar has a bent configuration substantially similar to that of the bent ends 56 of the frame 52.

Dolly 50 is substantially similar to dolly 10, but is simpler in construction and lighter in weight, weighing about 40 pounds. Also, connecting the V-shaped members 60 to the frame ends 56 disposes them inwardly of the sides 54 and permits the members to be more closely spaced at a distance of about 10 inches from each other. The ends of the members thus can support the ends of objects which are shorter than five feet, such as rolls of 54- inch carpet.

The operation of the dolly 50 is the same as that of dolly 10 and further description thereof is deemed unnecessary.

The present invention thus provides a dolly for the handling of long heavy objects by a single person which is highly effective in operation and can easily negotiate narrow passageways, curbs, steps, and irregular terrain and facilitates the receipt and centering of the object thereon and discharge therefrom.

While I have shown and described in considerable detail what I believe to be the preferred embodiments of my invention, it will be understood by those skilled in the art that it could take various other forms without departing from the spirit of the invention as defined in the claims that follow.

I claim:

1. A lightweight, pneumatic-tired dolly for transporting long, heavy rolls of carpeting or the like and maneuvering the same through narrow passageways, over curbs, up steps, and on irregular terrain, by one person, said dolly comprising an elongated rectangular frame of round tubular material having a pair of parallel side members and a pair of downwardly bent, transverse end members joined together by rounded corners for cradling a long, heavy roll of carpeting or the like longitudinally thereof, the width of said frame being less than the width of a doorway, a downwardly bent, center crossbar extending transversely between and fixedly attached to said side members at the midpoint thereof, a pair of laterally spaced supports secured to the frame inwardly of the side edges thereof, each of said supports consisting of a symmetrically formed V-shaped member of tubular material having its ends joined to said end members of the frame, said V-shaped members being disposed in vertical planes parallel to said side members of the frame and spaced inwardly therefrom a distance only slightly greater than the width of a pneumatic tire, a transverse axle sleeve fixed to said V-shaped support members at the apex of the V, said axle sleeve terminating at the outer sides of the support members, an axle extending through said sleeve and projecting from opposite ends thereof, said axle having an overall length not more than the width of said frame, a pair of upwardly converging bracing struts joined at their lower ends to said axle sleeve adjacent the junction of said supports thereto, said bracing struts being joined at their upper ends to said center crossbar near the midpoint thereof, and a pair of laterally spaced wheels journaled on the projecting ends of the axle and disposed inwardly of the frame side edges and directly under said center crossbar, said wheels having pneumatic tires of a size to permit easy rolling over irregular terrain, curbs, steps, and the like to enable one man to maneuver a heavy roll of carpeting from a loading point outside of a building to an interior room in which the carpeting is to be laid, said dolly being devoid of projections extending upwardly or laterally from the frame for facilitating loading of the roll of carpeting on the dolly and passage of the loaded dolly through passageways only slightly wider than the frame, and the frame being tiltable downwardly at one end for disposing the roll of carpeting in tilted position and moving the dolly relative thereto for centering or discharge of the roll.